United States Patent
Jee et al.

(10) Patent No.: US 8,220,604 B2
(45) Date of Patent: Jul. 17, 2012

(54) DAMPING FORCE VARIABLE VALVE AND SHOCK ABSORBER INCLUDING THE SAME

(75) Inventors: Young Whan Jee, Gyeonggi-do (KR); Kyu Shik Park, Seoul (KR)

(73) Assignee: Mando Corporation, Gyeonggi-Do (KR)

( * ) Notice: Subject to any disclaimer, the term of this patent is extended or adjusted under 35 U.S.C. 154(b) by 447 days.

(21) Appl. No.: 12/501,264

(22) Filed: Jul. 10, 2009

(65) Prior Publication Data
US 2010/0006383 A1  Jan. 14, 2010

(30) Foreign Application Priority Data

Jul. 11, 2008  (KR) ................. 10-2008-0067700

(51) Int. Cl.
*F16F 9/34* (2006.01)
(52) U.S. Cl. ............. 188/322.13; 188/266.6; 188/314; 188/322.14; 188/322.15; 188/322.2; 137/565.35; 137/625.65; 251/50; 251/51; 251/129.14; 251/129.15; 251/129.21
(58) Field of Classification Search ............. 188/322.13, 188/322.15, 322.14, 266.5, 322.2, 266.4; 251/129.15, 129.07, 48, 50, 51, 55, 125, 251/129.02, 129.08; 137/625.65
See application file for complete search history.

(56) References Cited

U.S. PATENT DOCUMENTS

| | | | |
|---|---|---|---|
| 4,809,749 A | 3/1989 | Ichihashi | |
| 4,971,114 A | 11/1990 | Ichihashi et al. | |
| 5,605,178 A | 2/1997 | Jennins | |
| 5,960,915 A * | 10/1999 | Nezu et al. | 188/266.6 |
| 6,405,757 B1 | 6/2002 | Jabcon | |
| 2008/0185246 A1* | 8/2008 | Park | 188/322.15 |

FOREIGN PATENT DOCUMENTS

| | | | |
|---|---|---|---|
| JP | 10047413 A | | 2/1998 |
| JP | 10252804 A | | 9/1998 |
| JP | 11082602 A | | 3/1999 |
| JP | 2003194133 A | * | 7/2003 |

\* cited by examiner

*Primary Examiner* — Robert A Siconolfi
*Assistant Examiner* — San Aung
(74) *Attorney, Agent, or Firm* — McDermott Will & Emery LLP

(57) ABSTRACT

A damping force variable valve includes a retainer having a main body connected at a central portion thereof to a high pressure part or portion of a shock absorber and having an outer peripheral region enlarging outwardly, and a spool rod integrally extending from the central portion and formed at a center thereof with a hollow portion having a spool inserted therein. The variable valve further includes a main disc disposed adjacent the retainer, a solenoid unit provided adjacent the spool rod and including a push rod for moving the spool when electrical power is applied, and an operating block installed adjacent the solenoid unit and including an enlarged portion coupled to the outer peripheral region of the main body.

13 Claims, 3 Drawing Sheets

DAMPING FORCE VARIABLE VALVE AND SHOCK ABSORBER INCLUDING THE SAME

BACKGROUND

1. Technical Field

The present disclosure relates to a damping force variable valve and a shock absorber including the same, and more particularly, to a damping force variable valve, which includes a spool rod having an efficiently configured structure that substantially resists twisting thereof, and a shock absorber including the same.

2. Description of the Related Art

Generally, a shock absorber absorbs or relieves sudden shocks or vibrations and is installed to, for example, a vehicle to ensure driving stability and ride comfort by quickly absorbing vibration of a spring caused by a road surface while the vehicle travels on the road.

Such a shock absorber provides a low damping force to enhance ride comfort by absorbing vibration due to unevenness of the road surface during ordinary travel of the vehicle, and provides a high damping force to enhance handling stability by suppressing a posture change of a vehicle body when the vehicle turns, accelerates, decelerates, travels at high speed, and other movements resulting in a vehicle posture change.

In recent years, the shock absorber has been developed to incorporate a damping force variable valve at one side thereof for properly adjusting damping characteristics according to road surface conditions and driving conditions of a vehicle in order to enhance ride comfort or handling stability.

To this end, conventional shock absorbers are provided with a damping force variable valve 70 as shown in FIG. 1 at one side of a base shell of the shock absorber to adjust the damping force.

FIG. 1 is a side sectional view of a conventional damping force variable valve. In a damping force variable valve 10, a spool 30 controls communication of a fluid while operating in a poppet valve manner with respect to a spool rod 20. As shown therein, the damping force variable valve 10 includes a solenoid unit 40, a spool rod 20, a spool 30, a lower retainer 22, a main disc 26, and an upper retainer 24.

The solenoid unit 40 is secured at an upper end thereof to a lower end of a valve housing 12 coupled to an outside of the shock absorber, and includes a bobbin 42 and a push rod 44 within an operating block 46. The push rod 44 moves up and down according to change in electric current or power applied to a coil wound around the bobbin 42. Further, the solenoid unit 40 is coupled at a lower end thereof to a cover 48.

The spool rod 20 has a hollow cylindrical shape and is disposed on an upper end of the operating block 46 of the solenoid unit 40. The spool rod 20 is provided at an upper end thereof with a plug 21, and a coil spring 21a is internally disposed between the plug 21 and the spool 30 to force the spool 30 to closely contact the push rod 44. Further, a plurality of connecting ports 20a, 20b and 20c through which the fluid flows are formed through the spool rod 20.

The lower retainer 22 is disposed around a periphery of the spool rod 20 and is formed therein with an inflow path 22a, a discharge path 22b, and a bypass path 22c.

Further, the main disc 26 is disposed to cover the inflow path 22a from a rear side of the lower retainer 22 and directly faces against operating oil passing through the inflow path 22a, thereby generating damping force.

Further, the upper retainer 24 is installed on top of the lower retainer 22 and forms a guide channel which guides the fluid from a high pressure chamber of the shock absorber into the lower retainer 22. Additionally, a nut 28 is provided on an upper periphery of the spool rod 20 to fasten the lower retainer 22 thereto.

The spool rod 20 is formed at one end thereof with a male thread portion, and the operating block 46 is formed at a middle portion thereof with a female thread portion such that the spool rod 20 and the operating block 46 can be detachably secured to each other.

However, the conventional damping force variable valve 10 and the shock absorber including the same can suffer twisting when the spool rod 20 and the operating block 46 are threadedly coupled to each other, so that the spool 20 cannot move up and down smoothly. Further, the conventional damping force variable valve 10 has a complicated internal structure, generates a scattered damping force according to an assembled state of respective components, and cannot provide a desired damping force at low speed due to initial resistance. Moreover, assembling the respective components of the conventional damping force variable valve 10 is difficult and requires substantial time, thereby lowering productivity of final products.

BRIEF SUMMARY

In one embodiment, a damping force variable valve includes an improved spool rod to minimize internal twisting, a simplified internal channel to obtain a reliable damping force at low speed, and has a simplified overall structure and a reduced number of components to enhance productivity. In one embodiment, a shock absorber including a damping force variable valve is provided.

According to one aspect, there is provided a damping force variable valve installed to a shock absorber including a cylinder, a reservoir chamber communicating with the cylinder, a high pressure part connected to a rebound chamber of the cylinder and a low pressure part connected to the reservoir chamber, the damping force variable valve including a retainer including a main body connected toward a central portion thereof to the high pressure part and having an outer diameter increasing outwardly, and a spool rod integrally positioned toward the central portion of the main body and having toward a center thereof a hollow portion having a spool inserted therein; a main disc disposed adjacent or under the retainer; a solenoid unit provided adjacent or under the spool rod and including a push rod configured to move the spool when electrical power is applied; and an operating block installed adjacent or on top of the solenoid unit and including an enlarged portion extending to be coupled to an outer circumference or peripheral region of the main body.

In one embodiment, the main body may have a male thread portion formed toward an outer peripheral surface thereof, and the enlarged portion may have a female thread portion formed toward an upper inner peripheral surface thereof to engage with the male thread portion. In one embodiment, the retainer may include a connecting port formed at an upper end thereof and connected to a high pressure chamber of the shock absorber; an inflow path connected to the connecting port and passing through the main body; a discharge path connected to a low pressure chamber of the shock absorber and allowing a fluid to be discharged, the fluid being supplied while pushing back the main disc, for example, elastically; and a plurality of communication ports formed to pass through the spool rod thereby allowing a fluid to flow therethrough. In one embodiment, the retainer may be formed by a sintering process.

According to another aspect, there is provided a shock absorber provided at one side thereof with a damping force variable valve controlling damping force, wherein the shock absorber includes a cylinder, a reservoir chamber communicating with the cylinder, a high pressure part connected to a rebound chamber of the cylinder, and a low pressure part connected to the reservoir chamber, and wherein the damping force variable valve includes a retainer including a main body connected at a central portion thereof to the high pressure part and having an outer diameter increasing outwardly, and a spool rod integrally positioned or extending from the central portion of the main body, and formed toward a center thereof with a hollow portion having a spool inserted therein; a main disc disposed adjacent or under the retainer; a solenoid unit provided under the spool rod and including a push rod configured to move the spool when electrical power is applied; and an operating block installed adjacent or on top of the solenoid unit and including an enlarged portion extending to be coupled to an outer circumference or peripheral region of the main body.

DETAILED DESCRIPTION

Hereinafter, example embodiments will be described with reference to accompanying drawings in FIGS. 2 and 3.

Figure 1:
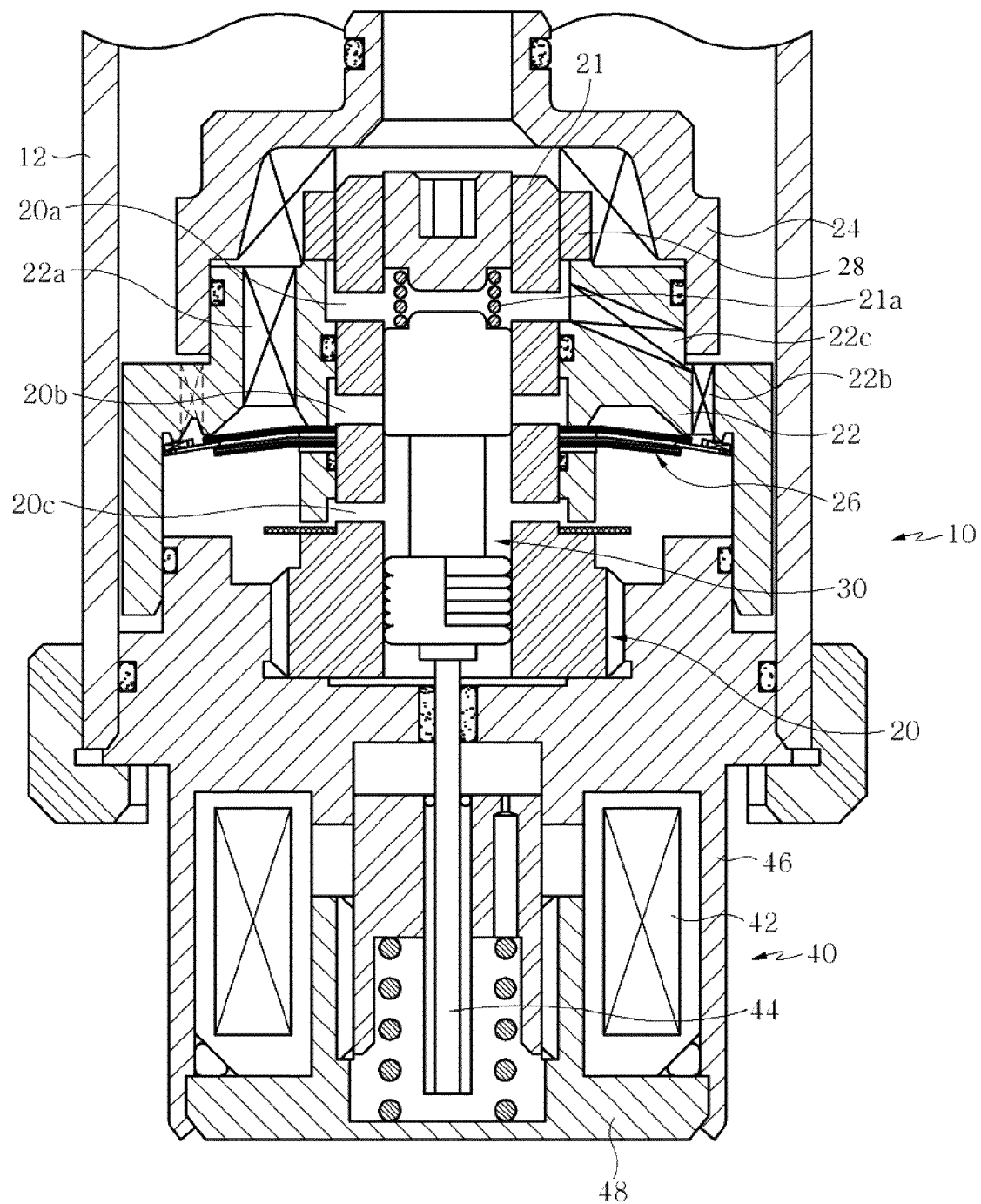
FIG. 1 is a side-sectional view of a damping force variable valve according to prior art.
Figure 2:
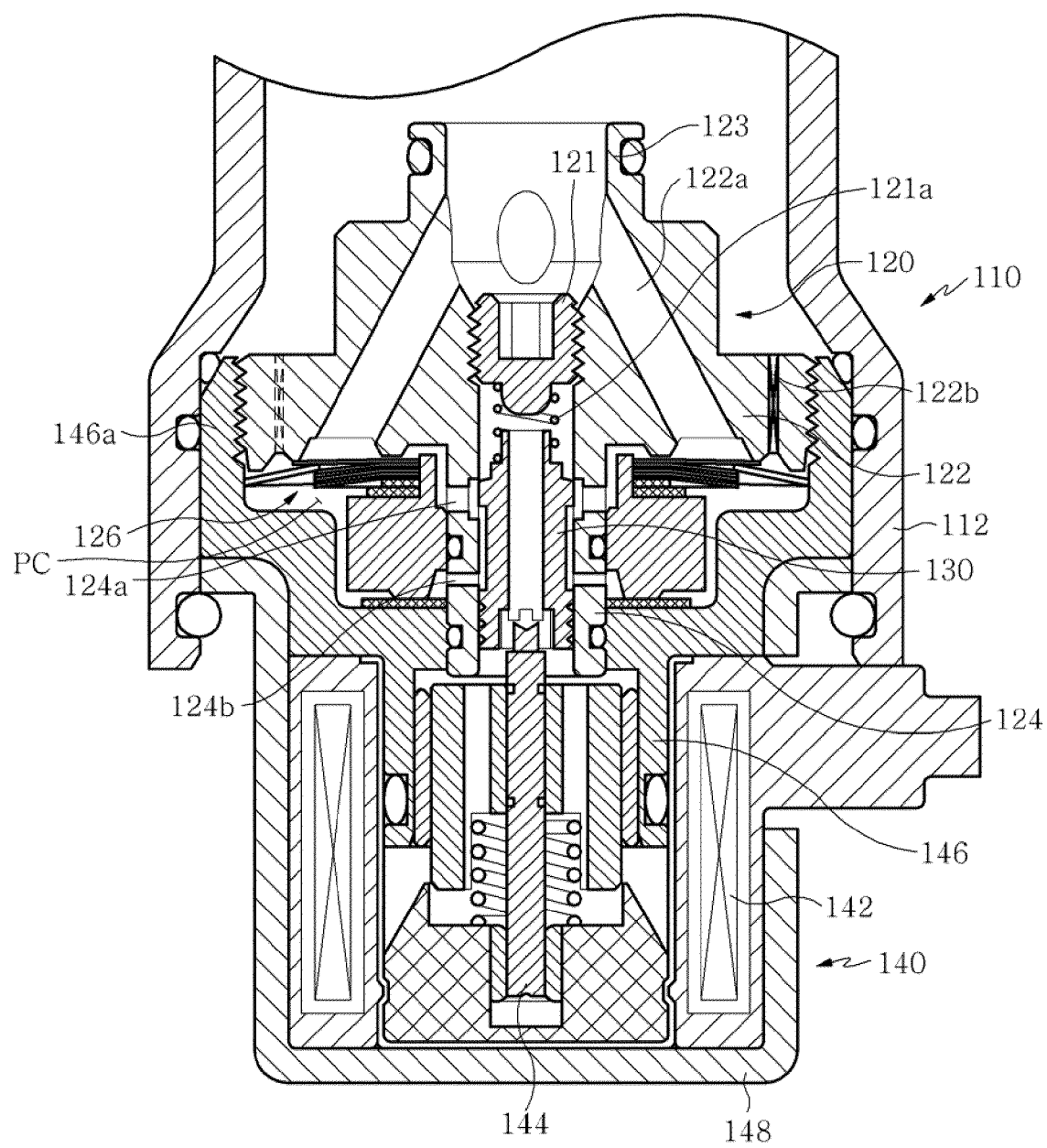
FIG. 2 is a side-sectional view of a damping force variable valve according to one embodiment.

FIG. 2 is a side-sectional view of a damping force variable valve according to one embodiment. FIG. 3 illustrates a side-sectional view of a shock absorber including the damping force variable valve according to one embodiment.

Figure 3:
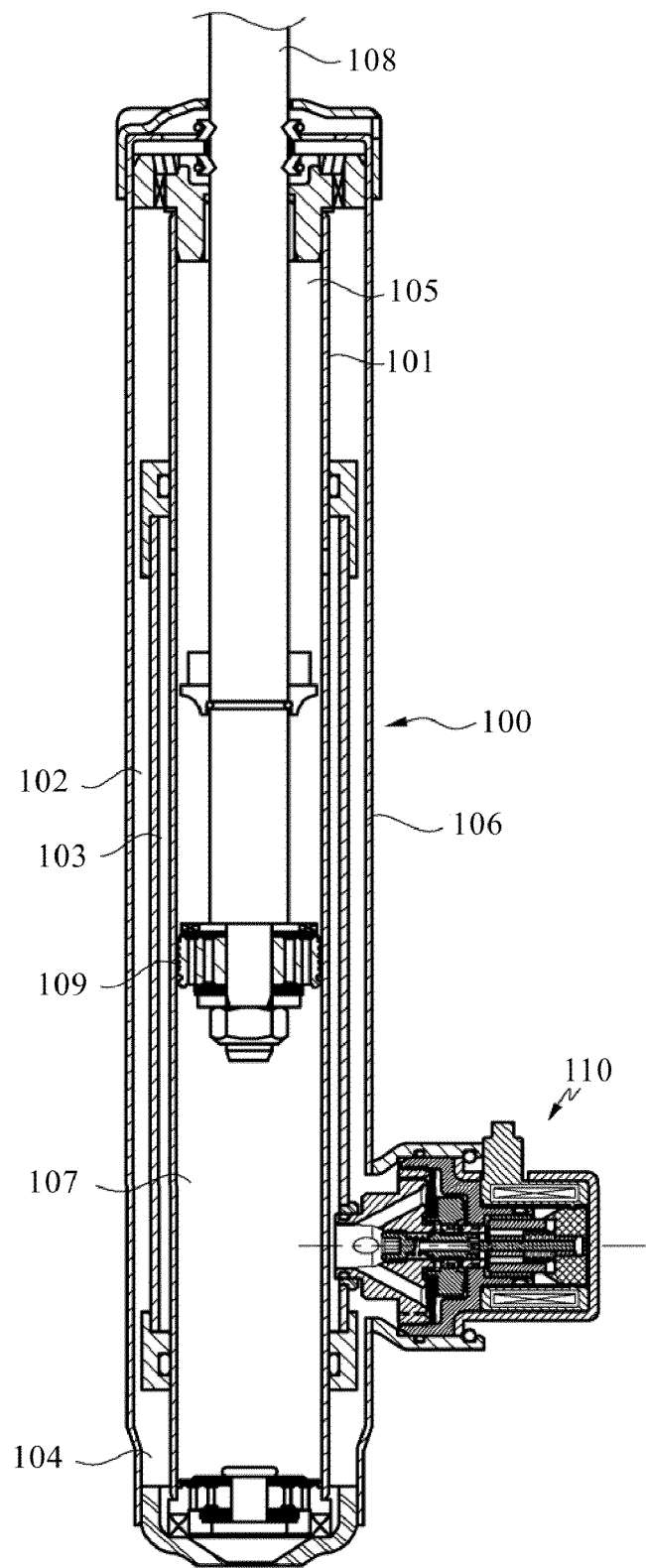
FIG. 3 is a side-sectional view of a shock absorber including a damping force variable valve according to one embodiment.

As shown in FIG. 3, a damping force variable valve 110 according to one embodiment can be incorporated in a shock absorber 100 that includes a cylinder 101, a reservoir chamber 102 communicating with the cylinder 101, a high pressure part 103 connected to a rebound chamber 105 of the cylinder 101, and a low pressure part 104 connected to the reservoir chamber 102. The shock absorber 100 can include a base shell 106. Further, the shock absorber 100 can include a piston rod 108 having one end inside the cylinder 101, the end having or being coupled to a piston valve 109, to form a compression chamber 107 within the cylinder 101.

Referring to FIG. 2, the damping force variable valve 110 includes a valve housing 112, a retainer 120 and a main disc 126 disposed inside the valve housing 112, and a solenoid unit 140 coupled adjacent or to a side of the valve housing 112.

The retainer 120 includes a main body 122 and a spool rod 124, which in one aspect can be integrally formed with the main body 122.

The main body 122 is connected or in fluid communication toward a central portion thereof to the high pressure part and has an outer diameter increasing outwardly. In one embodiment, the retainer 120 has a connecting port 123 formed toward an end of the main body 122 and connected or in fluid communication with to a high pressure chamber of the shock absorber.

Further, an inflow path 122a connected to the connecting port 123 is formed through the main body 122. The inflow path 122a extends at an angle with respect to a longitudinal axis of the main body 122, so that operating fluid having passed through the inflow path 122a can be discharged to a side of the retainer 120, for example, away from the connecting port 123.

The spool rod 124 includes a hollow portion toward a central region of the spool rod 124, into which a spool 130 is inserted. Further, the spool rod 124 is formed with a plurality of communication ports through which a fluid can flow. Among the communication ports, an upper communication port 124a guides the operating fluid from the inflow path 122a into the spool rod 124. Further, a lower communication port 124b supplies the operating fluid to a pressure chamber PC, so that an opening/closing pressure of the main disc 126 can be controlled by the operating fluid introduced into the pressure chamber PC.

With the spool 130 inserted into the hollow portion of the spool rod 124, a spring 121a for elastically supporting the spool 130 is inserted into the spool rod 124 and a plug 121 is coupled to a side of the spool rod 124, for example, toward the connecting port 123. The spring 121a forces the spool 130 to closely contact a push rod 144.

The main disc 126 is disposed to cover the inflow path 122a at a rear side of the retainer 120, and directly faces against the operating fluid passing through the inflow path 122a, thereby generating a damping force. The main disc 126 counteracts the operating fluid flowing in the inflow path 122a, and is then pulled back during the counteraction, thereby causing the operating fluid to flow toward a discharge path 122b.

In one embodiment, an internal slit can be formed inside the main disc 126 to allow some of the operating fluid passing through the inflow path 122a to flow in a direction different from a direction toward the discharge path 122b. The internal slit fluidly communicates with the communication ports 124a, 124b of the spool rod 124. In one embodiment, an external slit can be formed on an outer surface of the main disc 126. The external slit fluidly communicates with the discharge path 122b. The discharge path 122b is formed in the retainer 120 and discharges a fluid to be discharged toward the low pressure part, wherein the fluid is supplied while pushing back the main disc 126 according to pressure of the pressure chamber PC.

The solenoid unit 140 is detachably coupled toward an end thereof toward an end of the valve housing 112. The valve housing 112 is coupled to the shock absorber 100 (FIG. 3), for example, to the base shell 106 thereof. The solenoid unit 140 includes a bobbin 142 and a push rod 144 within an operating block 146. In one embodiment, a coil is wound around the bobbin 142 to generate a magnetic force according to change of an electric current or power applied to the coil, and the push rod 144 can be moved therein according to the change of the electric current or power applied to the coil.

In one embodiment, the operating block 146 is installed adjacent the solenoid unit 140 so as to guide the push rod 144 and close an upper portion of the solenoid unit 140. The operating block 146 is formed with a coupling portion, such as an enlarged portion 146a, an outer periphery of which extends toward the retainer 120. Further, the solenoid unit 140 is coupled toward an end thereof to a cover unit 148.

The retainer 120 is coupled to the enlarged portion 146a of the operating block 146, for example, fixedly coupled thereto.

In one embodiment, the retainer 120 is formed with a male thread portion on an outer peripheral surface of the main body 122, the operating block 146 is formed with a female thread portion corresponding to the male thread portion on an inner peripheral surface of at least a portion of the enlarged portion 146a. The male thread portion of the retainer 120 engages with the female thread portion of the enlarged portion 146a.

Accordingly, the outer peripheral surface of the retainer 120 is coupled to the operating block 146, so that the spool rod 124 is not directly influenced by twisting, for example from loads or torques experienced by the base shell 106 and/or valve housing 112. Accordingly, the spool rod 124 does not experience deformations that may obstruct or introduce friction against the motion of the spool 130 during vehicle posture changes, facilitating efficient operation of the damping force variable valve 110, and the shock absorber 100.

The retainer 120 may be formed by a sintering process. Accordingly, the retainer 120 may be formed with a plurality of pores, which are filled with a fluid such as oil. Therefore, friction between the spool 130 and the spool rod 124 is suppressed while the spool 130 is reciprocating.

As apparent from the above description, in the damping force variable valve according to one embodiment and the shock absorber including the same, the spool rod can be formed integrally with the retainer, thereby enabling a reduction in the number of components. Accordingly, it is not necessary to seal spaces between the respective components, so that the shock absorber does not undergo resistance to an initial damping force and reduces scattering of the damping force. Further, the operating block is coupled to the periphery of the retainer, thereby minimizing twisting of the spool rod while reducing assembly time with high assembly efficiency. As such, the reduced number of components and simplified assembly will lead to a significant reduction in production and retail costs. Further, in one embodiment, the retainer is formed with a simplified internal channel, thereby providing a low damping force at low speed while enabling the damping force to be freely and simply adjusted. Moreover, since the retainer is formed by sintering, in one embodiment, fabrication of the retainer is efficient, characteristic behaviors of the spool can be enhanced by lubrication using an oil contained in the retainer due to sintering characteristics, internal temperature can be prevented from increasing, and viscosity of the oil can be prevented from being lowered.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A damping force variable valve configured to be coupled to a shock absorber, the damping force variable valve comprising:
    a retainer including a main body including an outer peripheral region;
    a spool rod integrally coupled to a central portion of the main body and having a hollow portion having a spool inserted therein;
    a main disc disposed adjacent the retainer;
    a solenoid unit provided adjacent the spool rod and including a push rod configured to move the spool when electrical power is applied; and
    an operating block installed adjacent at least a portion of the solenoid unit and including a coupling portion coupled to the outer peripheral region of the main body, substantially preventing a direct torque from being transferred to the spool rod and facilitating substantially unobstructed movement of the spool,
    wherein the main body has a male thread portion formed on an outer peripheral surface thereof, and the coupling portion has a female thread portion formed on an inner peripheral surface thereof to engage with the male thread portion.

2. The damping force variable valve of claim 1, further comprising:
    a connecting port toward a first end of the retainer and configured to be in fluid communication with a high pressure chamber of the shock absorber;
    an inflow path formed in the retainer, in fluid communication with the connecting port and extending through the main body toward the main disc, the main disc being elastically deformable to facilitated fluid passing through the retainer and temporally deforming the main disc at or above a threshold pressure;
    a discharge path formed in the retainer, configured to be in fluid communication with a low pressure chamber of the shock absorber and allowing a fluid to be discharged; and
    a plurality of communication ports formed to pass through the spool rod, facilitating a fluid to flow therethrough.

3. The damping force variable valve of claim 1 wherein the retainer is formed by a sintering process.

4. The damping force variable valve of claim 1 wherein the main body includes an outer diameter that increases from a first end toward a second end of the main body, the outer peripheral region being positioned toward the second end.

5. The damping force variable valve of claim 1 wherein the coupling portion of the operating block includes a larger diameter than a portion of the coupling block adjacent the portion of the solenoid unit.

6. The damping force variable valve of claim 1, further comprising:
    a valve housing configured to be coupled to the shock absorber, the coupling portion of the operating block being positioned between the valve housing and the main body of the retainer.

7. A shock absorber comprising:
    a cylinder having a rebound chamber;
    a reservoir chamber in fluid communication with the cylinder;
    a high pressure portion connected to, or in fluid communication with, the rebound chamber of the cylinder; and
    a low pressure portion connected to, or in fluid communication with, the reservoir chamber; and
    a damping force variable valve configured to control a damping force and including a retainer having a main body connected toward a central portion thereof to the high pressure portion and having an outer peripheral region including a diameter increasing outwardly, a spool rod integrally extending from the central portion of the main body and formed at a center thereof with a hollow portion, a spool inserted in the hollow portion, a main disc disposed adjacent the retainer, a solenoid unit provided adjacent the spool rod and including a push rod configured to move the spool when electrical power is applied, and an operating block installed adjacent a portion of the solenoid unit and including an enlarged portion coupled to the outer peripheral region of the main body, wherein the main body has a male thread portion formed on an outer peripheral surface thereof, and the enlarged portion has a female thread portion formed on an inner peripheral surface thereof to engage with the male thread portion.

8. A damping force variable valve configured to be coupled to a shock absorber, the damping force variable valve comprising:
- a retainer including a main body including an outer peripheral region;
- a spool rod integrally coupled to a central portion of the main body and having a hollow portion having a spool inserted therein;
- a main disc disposed adjacent the retainer;
- a solenoid unit provided adjacent the spool rod and including a push rod configured to move the spool when electrical power is applied; and
- an operating block installed adjacent at least a portion of the solenoid unit and including a coupling portion coupled to the outer peripheral region of the main body, substantially preventing a direct torque from being transferred to the spool rod and facilitating substantially unobstructed movement of the spool,
- wherein the retainer is formed by a sintering process.

9. The damping force variable valve of claim 8, wherein the main body has a male thread portion formed on an outer peripheral surface thereof, and the coupling portion has a female thread portion formed on an inner peripheral surface thereof to engage with the male thread portion.

10. The damping force variable valve of claim 8, further comprising:
- a connecting port toward a first end of the retainer and configured to be in fluid communication with a high pressure chamber of the shock absorber;
- an inflow path formed in the retainer, in fluid communication with the connecting port and extending through the main body toward the main disc, the main disc being elastically deformable to facilitated fluid passing through the retainer and temporally deforming the main disc at or above a threshold pressure;
- a discharge path formed in the retainer, configured to be in fluid communication with a low pressure chamber of the shock absorber and allowing a fluid to be discharged; and
- a plurality of communication ports formed to pass through the spool rod, facilitating a fluid to flow therethrough.

11. The damping force variable valve of claim 8 wherein the main body includes an outer diameter that increases from a first end toward a second end of the main body, the outer peripheral region being positioned toward the second end.

12. The damping force variable valve of claim 8 wherein the coupling portion of the operating block includes a larger diameter than a portion of the coupling block adjacent the portion of the solenoid unit.

13. The damping force variable valve of claim 8, further comprising:
- a valve housing configured to be coupled to the shock absorber, the coupling portion of the operating block being positioned between the valve housing and the main body of the retainer.

* * * * *